(12) United States Patent
Todd

(10) Patent No.: US 9,663,259 B2
(45) Date of Patent: May 30, 2017

(54) GAS EVACUATION SYSTEM AND METHOD

(71) Applicant: Pall Corporation, Port Washington, NY (US)

(72) Inventor: Nathan Todd, Portsmouth (GB)

(73) Assignee: PALL CORPORATION, Port Washington, NY (US)

(*) Notice: Subject to any disclaimer, the term of this patent is extended or adjusted under 35 U.S.C. 154(b) by 135 days.

(21) Appl. No.: 14/633,707

(22) Filed: Feb. 27, 2015

(65) Prior Publication Data
US 2016/0251098 A1   Sep. 1, 2016

(51) Int. Cl.
B65B 31/00 (2006.01)
B65B 31/04 (2006.01)
B65D 33/01 (2006.01)
G01M 3/32 (2006.01)

(52) U.S. Cl.
CPC ............. *B65B 31/00* (2013.01); *B65B 31/04* (2013.01); *B65D 33/01* (2013.01); *G01M 3/32* (2013.01); *G01M 3/3218* (2013.01)

(58) Field of Classification Search
CPC .... G01M 3/32; G01M 3/3209; G01M 3/3218; G01M 3/3227; G01M 3/3236; G01M 3/3245; G01M 3/3254; G01M 3/3263; G01M 3/3272; G01M 3/3281; G01M 3/329; B65B 31/00; B65B 31/04; B65D 33/01
USPC ........................................ 73/49.2, 49.3, 49.4
See application file for complete search history.

(56) References Cited

U.S. PATENT DOCUMENTS

| 3,179,546 | A | | 4/1965 | Fischer | |
|---|---|---|---|---|---|
| 3,813,923 | A | * | 6/1974 | Pendleton | G01M 3/229 73/40.7 |
| 4,284,209 | A | | 8/1981 | Barbour | |
| 4,656,866 | A | * | 4/1987 | Aarts | G01M 3/3218 73/49.3 |
| 4,905,501 | A | * | 3/1990 | Sawatani | G01M 3/3281 73/40 |
| 6,044,717 | A | * | 4/2000 | Biegelsen | B65H 7/02 399/16 |
| 6,584,829 | B1 | * | 7/2003 | Flosbach | G01M 3/202 73/40.7 |
| 6,637,177 | B1 | | 10/2003 | Trillich et al. | |
| 6,732,571 | B1 | * | 5/2004 | Flosbach | G01M 3/20 340/605 |
| 7,475,590 | B2 | * | 1/2009 | Yokota | G01M 3/36 73/45.4 |
| 7,788,967 | B2 | * | 9/2010 | Golding | G01M 3/229 73/40 |
| 7,806,865 | B1 | | 10/2010 | Wilson | |

(Continued)

FOREIGN PATENT DOCUMENTS

CN  202819824 U  3/2013
EP  0 371 699 A1  6/1990

(Continued)

OTHER PUBLICATIONS

Intellectual Property Office of Singapore, Written Opinion in counterpart SG Application No. 10201510381S, mailed Aug. 10, 2016.

*Primary Examiner* — Jason K Niesz
*Assistant Examiner* — Andrew Stclair
(74) *Attorney, Agent, or Firm* — Jeremy Jay

(57) ABSTRACT

Gas evacuation systems for removing gas from flexible bags, and methods of using the systems, are disclosed.

20 Claims, 9 Drawing Sheets

(56) References Cited

U.S. PATENT DOCUMENTS

| | | |
|---|---|---|
| 2001/0020628 A1 | 9/2001 | Campion |
| 2004/0159144 A1 | 8/2004 | Abelen et al. |
| 2009/0188211 A1 | 7/2009 | Galliher et al. |
| 2009/0288370 A1 | 11/2009 | Ours et al. |
| 2009/0301034 A1 | 12/2009 | Abraham et al. |
| 2011/0011164 A1 | 1/2011 | Terentiev et al. |
| 2015/0316441 A1* | 11/2015 | Subhash ............... G01M 3/147 73/49.3 |

FOREIGN PATENT DOCUMENTS

| | | |
|---|---|---|
| EP | 0 741 288 A1 | 11/1996 |
| WO | WO 02/49707 A2 | 6/2002 |
| WO | WO 2009/078937 A2 | 6/2009 |
| WO | WO 2011/133023 A1 | 10/2011 |

* cited by examiner

GAS EVACUATION SYSTEM AND METHOD

BACKGROUND OF THE INVENTION

Flexible containers such as biocontainer bags are tested before use by using leak testing apparatus to fill the containers with sterile gas to test for leaks. After completing the test, the containers can be vented by opening a vent valve or by passing the gas through the leak testing apparatus and/or by using a evacuation pump. Alternatively, the containers can be leak tested using chambers or compression plates and high pressure, wherein the chambers or plates prevent total inflation of the containers, and the gas is vented due to release of the pressure.

Some testing procedures leave an undesirable volume of gas in the bag after testing. Additionally, or alternatively, testing the containers and/or filling the containers with the desired volume of product after testing can lead to bag damage. The use of an evacuation pump can distort and/or damage the bag. It can be difficult to test bags of different sizes and/or having different arrangements of ports.

The present invention provides for ameliorating at least some of the disadvantages of the prior art. These and other advantages of the present invention will be apparent from the description as set forth below.

BRIEF SUMMARY OF THE INVENTION

An embodiment of the invention provides a gas evacuation system for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one port arranged at the bottom end or the top end, optionally including at least one conduit, wherein the port is in fluid communication with the interior volume and, if present, the conduit, the system comprising (a) a flexible polymeric sheet having a density of at least about 3 $Kg/m^2$, and a sheet top end, a sheet bottom end, and sheet side ends, and a length and a width to substantially cover one of the flexible side walls of the bag; and, (b) a flexible bag receiving device, the receiving device comprising a base and at least one raised wall, and having a length and width greater than the length and width of the flexible bag; wherein one end of the polymeric flexible sheet is secured to the receiving device.

In another embodiment, a method is provided for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one port arranged at the bottom end or the top end, optionally including at least one conduit, wherein the port is in fluid communication with the interior volume and, if present, the conduit, and a gas flow path from the interior volume through the port and the optional conduit is initially closed, the method comprising (a) placing the gas-filled flexible bag on a base of a bag receiving device, the receiving device comprising the base and at least one raised wall, and having a length and width greater than the length and width of the flexible bag; (b) placing a flexible polymeric sheet having a density of at least about 3 $Kg/m^2$ in contact with a flexible side wall of the bag, wherein one end of the flexible polymeric sheet is secured to the receiving device, the flexible polymeric sheet having a length and a width substantially covering the flexible side wall of the bag; (c) opening the gas flow path from the interior volume through the port and conduit; and, (d) passing gas from the interior volume of the bag through the port and optional conduit.

In another embodiment, a method is provided for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one port arranged at the bottom end or the top end, optionally including at least one conduit, wherein the port is in fluid communication with the interior volume and, if present, the conduit, and a gas flow path from the interior volume through the port and the optional conduit is initially closed, the method comprising (a) placing an unfilled flexible bag on a base of a bag receiving device, the receiving device comprising the base and at least one raised wall, and having a length and width greater than the length and width of the flexible bag; (b) filling the flexible bag with gas; (c) placing a flexible polymeric sheet having a density of at least about 3 $Kg/m^2$ in contact with a flexible side wall of the bag, wherein one end of the flexible polymeric sheet is secured to the receiving device, the flexible polymeric sheet having a length and a width substantially covering the flexible side wall of the bag; (d) opening the gas flow path from the interior volume through the port and the optional conduit; and, (e) passing gas from the interior volume of the bag through the port and the optional conduit.

In another embodiment, a method is provided for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one port arranged at the bottom end or the top end, optionally including at least one conduit, wherein the port is in fluid communication with the interior volume and, if present, the conduit, and a gas flow path from the interior volume through the port and the conduit is initially closed, the method comprising (a) placing an unfilled flexible bag on a base of a bag receiving device, the receiving device comprising the base and at least one raised wall, and having a length and width greater than the length and width of the flexible bag; (b) placing a flexible polymeric sheet having a density of at least about 3 $Kg/m^2$ in contact with a flexible side wall of the bag, wherein one end of the flexible polymeric sheet is secured to the receiving device, the flexible polymeric sheet having a length and a width substantially covering the flexible side wall of the bag; (c) filling the flexible bag with gas; (d) opening the gas flow path from the interior volume through the port and optional conduit; and, (e) passing gas from the interior volume of the bag through the port and the optional conduit.

BRIEF DESCRIPTION OF THE SEVERAL VIEWS OF THE DRAWING(S)

Figure 7:
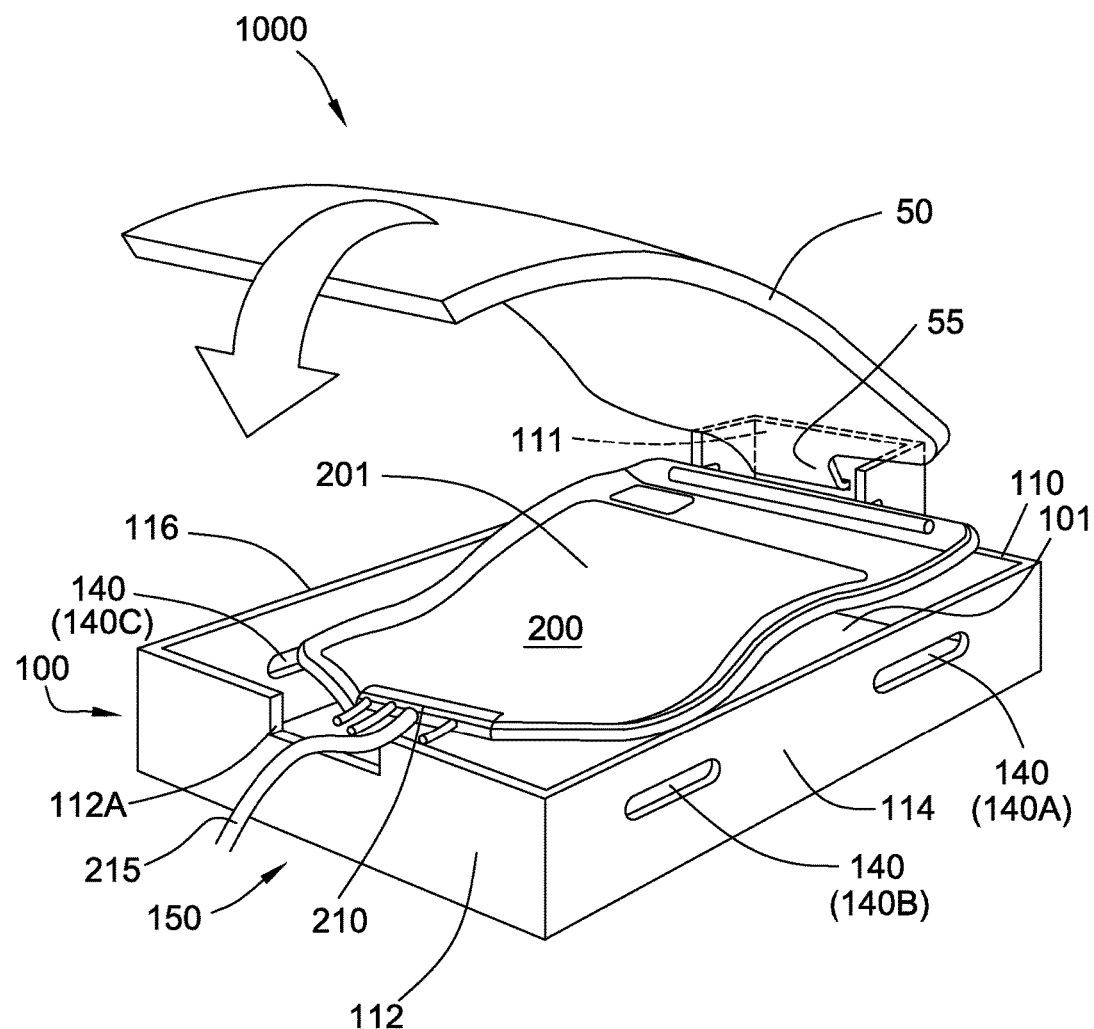

FIG. 7 illustrates a perspective view of another embodiment of a gas evacuation system of the present invention, the system comprising a flexible polymeric sheet and a bag receiving device comprising a base having two sets of opposing raised side walls, wherein one raised side wall has a cut out for receiving the conduit communicating with the interior volume of the bag, the raised side wall with the cut out being the wall opposing the raised wall having portions allowing the sheet, and a flexible bag, to be secured to the bag receiving device. FIG. 7 also shows an empty flexible bag secured to the bag receiving device.

Figure 8:
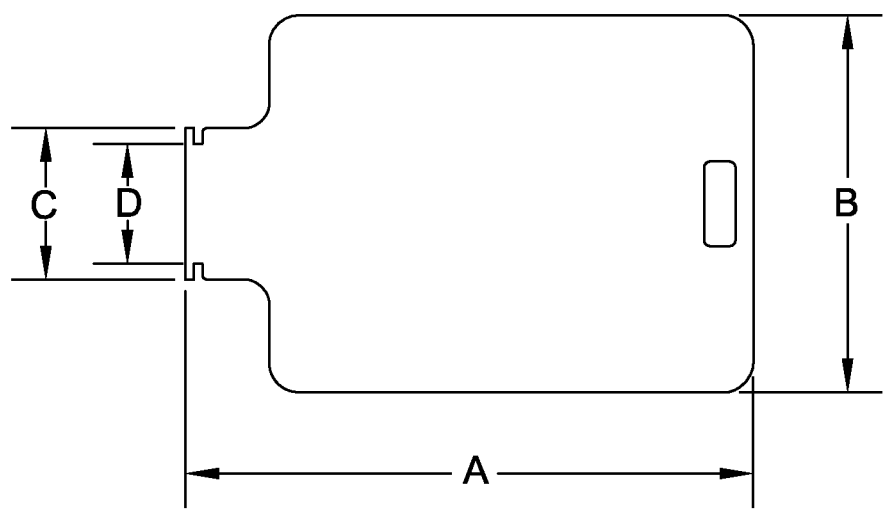

FIG. 8 illustrates some exemplary dimensions for flexible sheets for use in embodiments of gas evacuation systems of the present invention.

DETAILED DESCRIPTION OF THE INVENTION

In accordance with an embodiment of the present invention, a gas evacuation system is provided for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one port arranged at the bottom end or the top end, optionally including at least one conduit, wherein the port is in fluid communication with the interior volume and, if present, the conduit, the system comprising (a) a flexible polymeric sheet having a density of at least about 3 $Kg/m^2$, and a sheet top end, a sheet bottom end, and sheet side ends, and a length and a width to substantially cover one of the flexible side walls of the bag; and, (b) a flexible bag receiving device, the receiving device comprising a base and at least one raised wall, and having a length and width greater than the length and width of the flexible bag; wherein one end of the polymeric flexible sheet is secured to the receiving device.

In another embodiment, a method is provided for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one port arranged at the bottom end or the top end, optionally including at least one conduit, wherein the port is in fluid communication with the interior volume and, if present, the conduit, and a gas flow path from the interior volume through the port and the optional conduit is initially closed, the method comprising (a) placing the gas-filled flexible bag on a base of a bag receiving device, the receiving device comprising the base and at least one raised wall, and having a length and width greater than the length and width of the flexible bag; (b) placing a flexible polymeric sheet having a density of at least about 3 $Kg/m^2$ in contact with a flexible side wall of the bag, wherein one end of the flexible polymeric sheet is secured to the receiving device, the flexible polymeric sheet having a length and a width substantially covering the flexible side wall of the bag; (c) opening the gas flow path from the interior volume through the port and optional conduit; and, (d) passing gas from the interior volume of the bag through the port and optional conduit.

A method for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one port arranged at the bottom end or the top end, optionally including at least one conduit, wherein the port is in fluid communication with the interior volume and, if present, the conduit, and a gas flow path from the interior volume through the port and the optional conduit is initially closed, is provided according to another embodiment, the method comprising (a) placing an unfilled flexible bag on a base of a bag receiving device, the receiving device comprising the base and at least one raised wall, and having a length and width greater than the length and width of the flexible bag; (b) filling the flexible bag with gas; (c) placing a flexible polymeric sheet having a density of at least about 3 $Kg/m^2$ in contact with a flexible side wall of the bag, wherein one end of the flexible polymeric sheet is secured to the receiving device, the flexible polymeric sheet having a length and a width substantially covering the flexible side wall of the bag; (d) opening the gas flow path from the interior volume through the port and optional conduit; and, (e) passing gas from the interior volume of the bag through the port and optional conduit.

In another embodiment, a method is provided for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one port arranged at the bottom end or the top end, optionally including at least one conduit, wherein the port is in fluid communication with the interior volume and, if present, the conduit, and a gas flow path from the interior volume through the port and the optional conduit is initially closed, the method comprising (a) placing an unfilled flexible bag on a base of a bag receiving device, the receiving device comprising the base and at least one raised wall, and having a length and width greater than the length and width of the flexible bag; (b) placing a flexible polymeric sheet having a density of at least about 3 $Kg/m^2$ in contact with a flexible side wall of the bag, wherein one end of the flexible polymeric sheet is secured to the receiving device, the flexible polymeric sheet having a length and a width substantially covering the flexible side wall of the bag; (c) filling the flexible bag with gas; (d) opening the gas flow path from the interior volume through the port and optional conduit; and, (e) passing gas from the interior volume of the bag through the port and optional conduit.

In an embodiment of the system, the receiving device further comprises a retainer secured to the receiving device, wherein the retainer is arranged to hold one end of the bag.

In some embodiments of the system, the receiving device comprises at least one set of opposing raised walls, or two sets of opposing raised walls.

In a preferred embodiment of the system, wherein the receiving device comprises at least two opposing raised walls, at least one raised wall has a cut out arranged to receive the conduit of the bag when the bag is placed in the receiving device.

If desired, the end of the flexible polymeric sheet and the retainer are both secured to the same raised wall.

Preferably, the flexible polymeric sheet comprises a silicone sheet. Preferably, the flexible polymeric sheet has a density in the range of from about 3 Kg/m$^2$ to about 15 Kg/m$^2$.

Advantageously, bags of various sizes and configurations can be leak tested and evacuated in situ, and all, or substantially all, of the gas can be evacuated from the bags in about 10 minutes or less, typically, in about 1 to about 5 minutes (though it should be recognized that the time to evacuate can depend on the length of the conduit and other components between the outlet and the vent point). Embodiments of the invention can be used with 3D bags and, more preferably, with 2D (or "pillow") bags.

As used herein, the terms "gas" and "air" in the context of filling the bags, are used interchangeably unless specified otherwise, and refer to sterile gas/air.

Each of the components of the invention will now be described in more detail below, wherein like components have like reference numbers.

Figure 1:
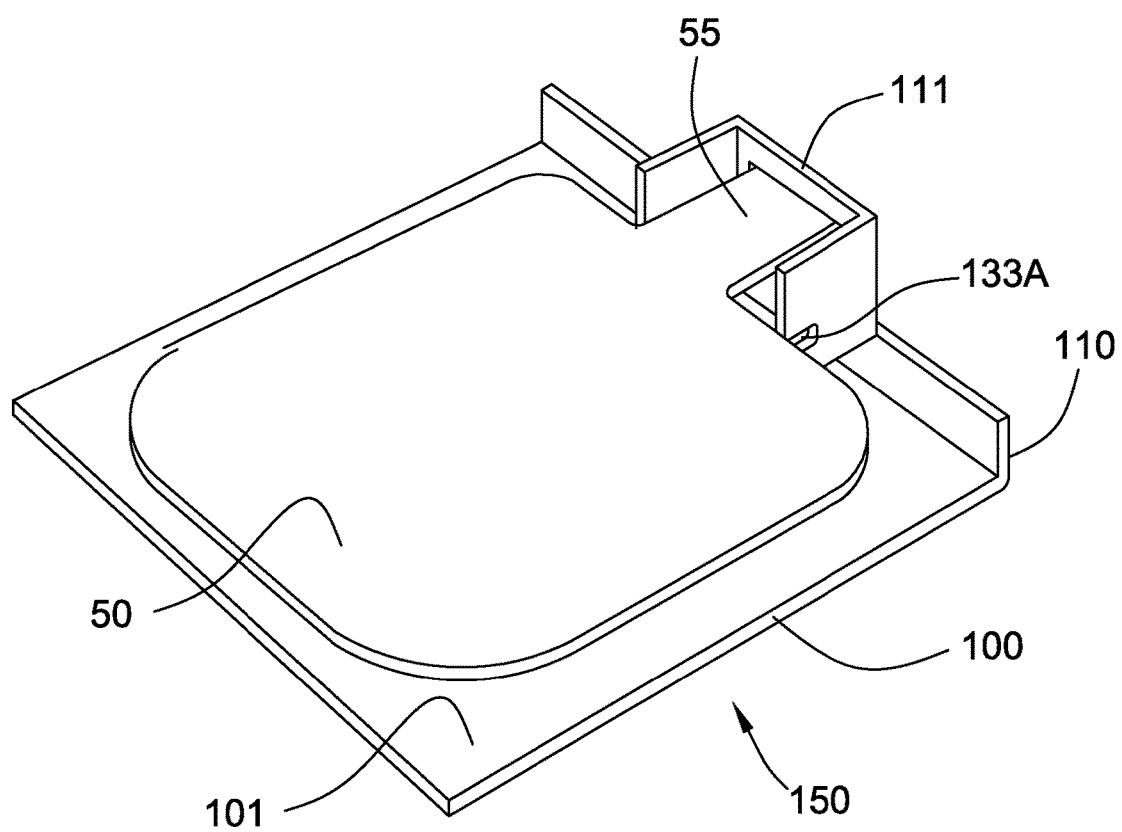
FIG. 1 illustrates a perspective view of an embodiment of a gas evacuation system of the present invention, the system comprising a flexible polymeric sheet and a bag receiving device comprising a base having a raised side wall, the raised side wall having portions allowing the sheet, and a flexible bag, to be secured to the bag receiving device.
Figure 4:
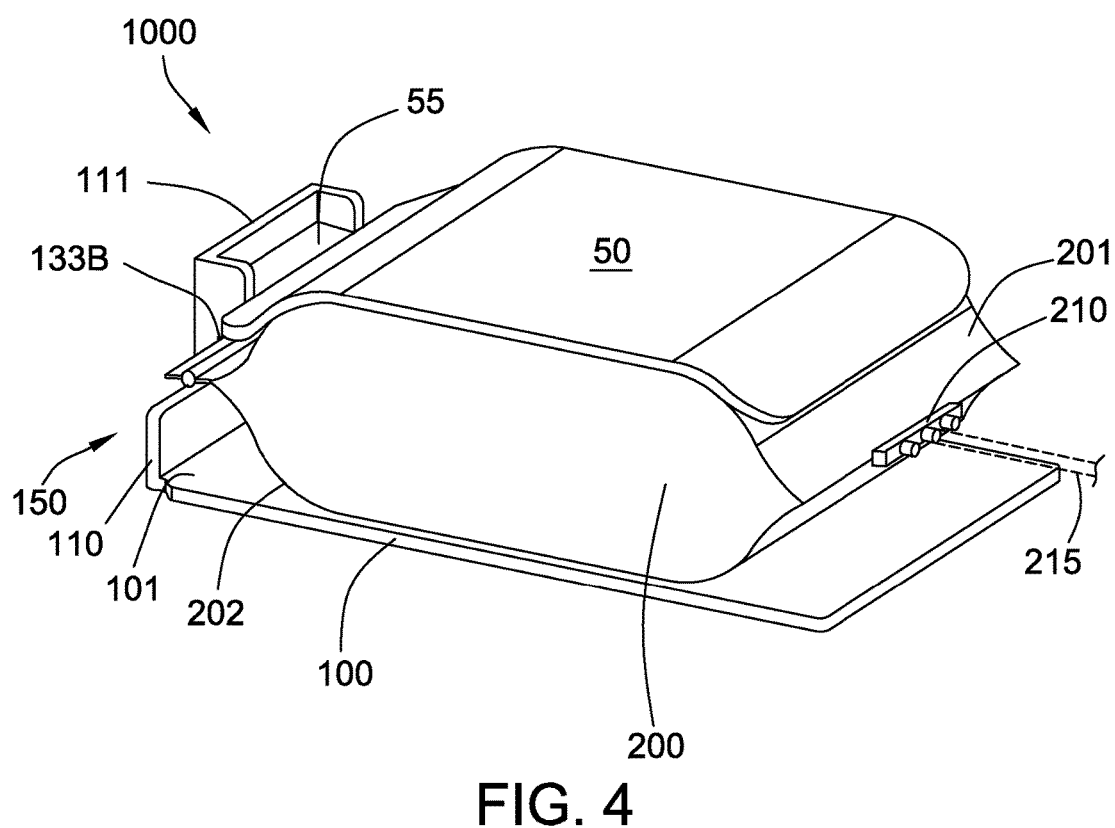
FIG. 4 illustrates a perspective view of the embodiment of a gas evacuation system shown in FIG. 1, also showing a gas-filled flexible bag (illustrated as a 2D bag).

In the illustrated embodiments of the system shown in FIGS. 1, 4, and 7, the system 1000 comprises a flexible sheet 50, a bag receiving device 150 comprising a base 100 comprising a surface 101, and at least one raised wall 110, the raised wall having a portion 111 for allowing the sheet, and a flexible bag (shown as 200 in FIGS. 4 and 7), to be secured to the bag receiving device.

Figure 2:
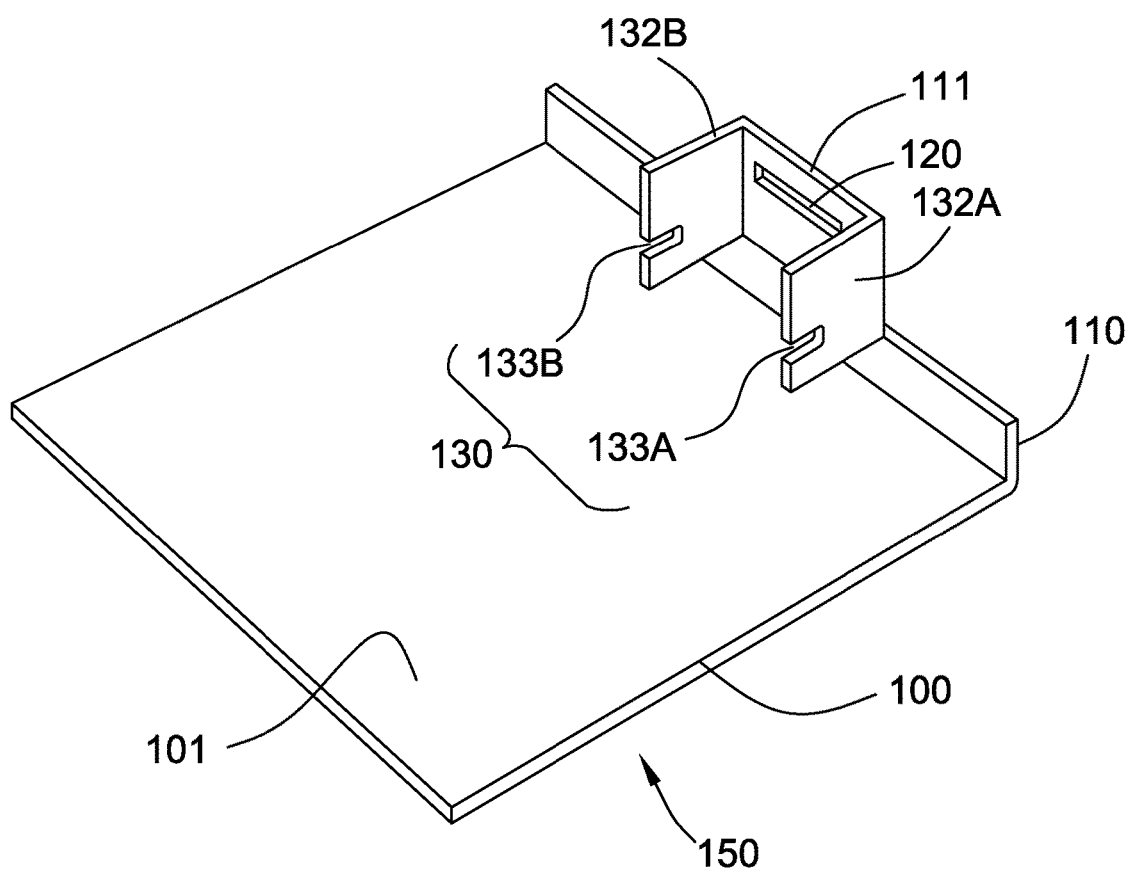
FIG. 2 illustrates of perspective view of the bag receiving device shown in FIG. 1, showing the portions of the raised side wall allowing the sheet, and a flexible bag, to be secured to the bag receiving device.
Figure 3A:
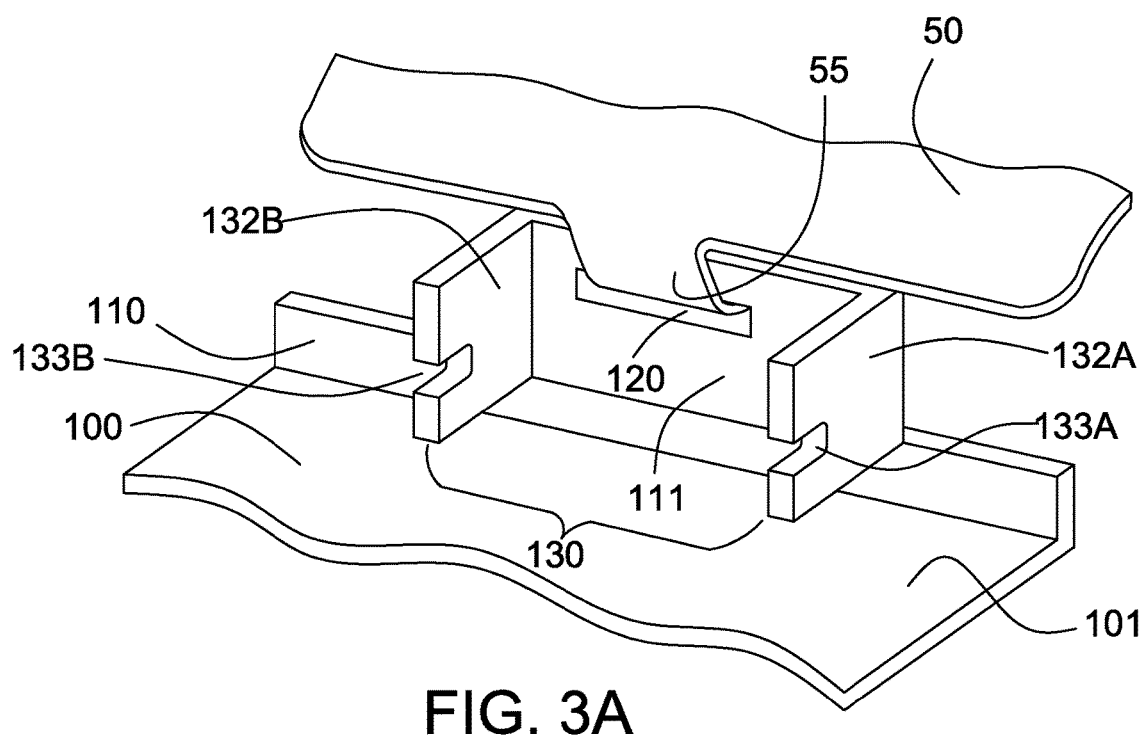
FIG. 3A shows a partial view of the portions of the raised side wall allowing the sheet, and a flexible bag, to be secured to the bag receiving device, the Figure also showing securing the sheet to the bag receiving device.
Figure 3B:
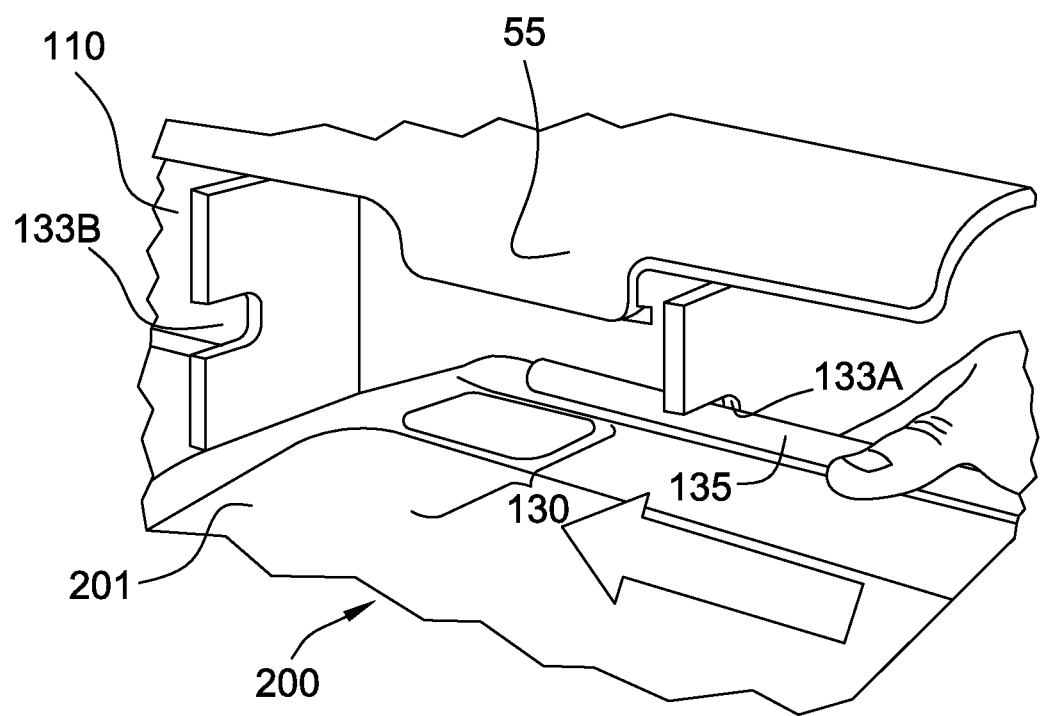
FIG. 3B shows an enlarged partial view of the portions of the raised side wall shown in FIG. 3A, also showing securing the bag to the bag receiving device.

In the illustrated embodiments, e.g., as shown in more detail in FIGS. 2, 3A, and 3B, portion 111 of the side wall 110 includes a slot or cut out 120 for securing (in some embodiments, removably securing) the sheet 50 to the bag receiving device 150. Preferably, as illustrated in FIGS. 1, 2, 3A, 3B, and 7, an extension or "tongue" 55 of the sheet 50 engages with the slot or cut out 120 to secure the sheet to the bag receiving device.

In the illustrated embodiments, the bag receiving device 150 further comprises a retainer 130 arranged to secure one end of the bag. For example, as shown in FIGS. 2, 3A, and 3B, showing retainer 130, portion 111 of raised side wall 110 can include slots or cut outs 133A, 133B, arranged in arms 132A, 132B attached to the side wall. Some commercially available bags include an element such as a rod or shaft that is engageable with slots 133A, 133B, allowing the bag to be secured to the bag receiving device (e.g., as shown in FIG. 4). Alternatively, and as shown in FIG. 3B, the retainer 130 can further comprise rod 135 that is engageable with slots 133A, 133B to secure the bag 200 to the bag receiving device.

The bag receiving device 150 has at least one raised side wall, but can have any number of raised walls. For example, in some embodiments, the bag receiving device has at least two opposing side walls, and in the embodiment shown in FIG. 7, the bag receiving device 100 has two sets of opposing side walls, i.e., one set of opposing side walls 110, and 112, and another set of opposing side walls, 114 and 116.

A flexible bag 200 having an interior volume, and a port 210 and a conduit 215 in fluid communication with the interior volume is shown in, for example, FIG. 4. FIG. 4 shows a 2D or pillow bag, having opposing flexible side walls 201 and 202 sealed at the edges and defining an interior volume therein. However, as would be recognized by one of ordinary skill in the art, the use of 3D bags is also encompassed by embodiments of the invention.

A variety of flexible bags, including commercially available bags, can be used in accordance with embodiments of the invention. For example, the bags can be made from different flexible materials, having different sizes, different shapes, and/or different configurations. Exemplary materials include polymeric materials. The bags can have any number of ports, arranged at any location with respect to the bag. As illustrated in FIGS. 4 and 7, the bag has at least one port 210, typically arranged at the top end or the bottom end of the bag, wherein the port is in fluid communication with both interior volume of the bag. Preferably, a flexible conduit 215 is attached to the port, and the port is in fluid communication with both the interior volume of the bag and a flexible conduit 215 attached to the port.

Figure 5:
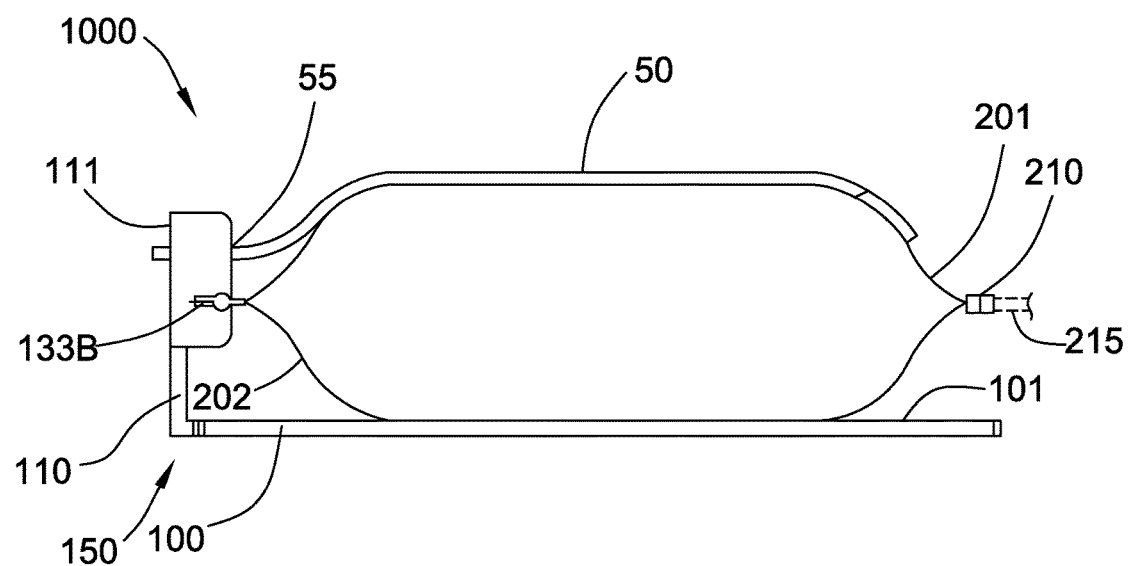
FIG. 5 shows a side view of an embodiment of the system with the bag, also showing the flexible sheet corresponding to the shape of the bag.
Figure 6:
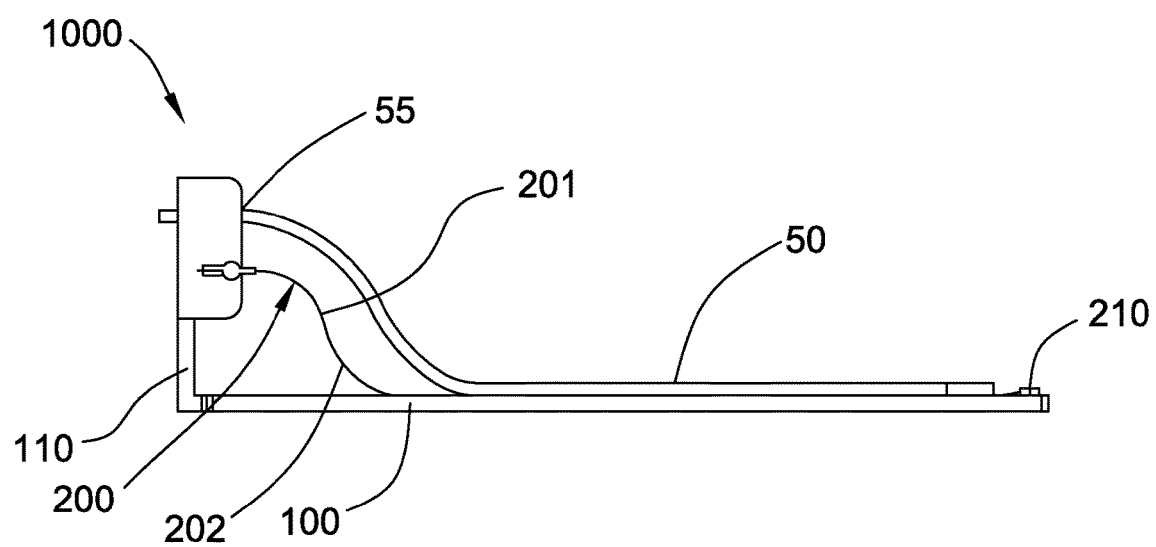
FIG. 6 shows a side view of the embodiment of the system with the bag as shown in FIG. 5, showing the appearance of the bag before being filled with gas or after gas has been evacuated from the bag.

A variety of flexible polymeric sheets are suitable for use in embodiments of the invention. The sheet should be flexible in order to generally conform to the shape of the bag (or at least conforming to the shape of the flexible wall of the bag contacting the sheet), e.g., as shown in FIG. 5 (showing a gas-filled bag) and 6 (showing a bag before being filled with gas, or after gas has been evacuated from the bag). The sheet can be made from any suitable flexible material, typically a polymeric and/or elastomeric material, such as, for example, silicone, polyvinyl chloride (PVC), neoprene, nitrile rubber, VITON, and a terpolymer of ethylene, propylene and a diene, such as, for example, ethylene propylene diene terpolymer (EPDM). One example of a suitable material is a general purpose silicone sheet available from Silex Silcones Ltd. (UK), as "silicone solid sheet."

The sheet can have any density as long it is sufficient to compress and evacuate the gas-filled flexible bag when placed on a wall of the bag and the gas fluid flow path from the interior of the bag is opened. For example, as explained in more detail below, in some embodiments, the sheet has a thickness in the range of from about 4 mm to about 20 mm, and a density in the range of from about 3 Kg/m$^2$ to about 15 Kg/m$^2$.

Using a silicone sheet as an example, the sheet has a specific gravity in the range of from about 1.1 to about 1.5 g/cm$^3$. Density is calculated by specific gravity (g/cm$^3$)× thickness (mm)=Kg/m$^2$.

Assuming a bag receiving device for a 5 L bag has dimensions of 0.56 m×0.42 m, the area=0.235 m$^2$. Using a silicone sheet thickness of 8 mm, and a specific gravity of 1.2 g/cm$^3$; density=1.2 g/cm$^3$×8 mm=9.6 Kg/m$^2$. For an evacuation system for a 5 L bag, 0.235 m$^2$×9.6 Kg/m$^2$=2.25 Kg.

Assuming a bag receiving device for a 10 L bag has dimensions of 0.66 m×0.47 m, the area=0.31 m$^2$. Using a silicone sheet thickness of 8 mm, and a specific gravity of 1.2 g/cm$^3$; density=1.2 g/cm$^3$×8 mm=9.6 Kg/m$^2$. For an evacuation system for a 10 L bag, 0.31 m$^2$×9.6 Kg/m$^2$=2.97 Kg.

Assuming a bag receiving device for a 50 L bag has dimensions of 0.9 m×0.75 m, the area=0.675 m$^2$. Using a silicone sheet thickness of 12 mm, and a specific gravity of 1.25 g/cm$^3$; density=1.25 g/cm$^3$×12 mm=15 Kg/m$^2$. For an evacuation system for a 50 L bag, 0.675 m$^2$×15 Kg/m$^2$=10.13 Kg.

In some embodiments, e.g., wherein a bag is about 20 L or greater, in order to complete bag evacuation in less time, a sheet having a greater thickness is used as compared to the thickness used when the bag has a lesser volume, e.g., about 5 to about 10 L.

The sheet can have suitable size, shape, and/or configuration. For example, as shown in FIG. 7, the sheet can have essentially the same dimensions of the base of the bag receiving device, or can have portions cut away (e.g., as shown in FIG. 1). Typically, the sheet should have a sufficient dimension to cover at least about 75% of the area, preferably at least about 90% of the area, of the flexible wall of the bag to be compressed. Preferably, the sheet should not cover the port of the bag from which gas is to be evacuated.

FIG. 8 shows some exemplary dimensions for flexible sheets for evacuating gas from bags of different volumes (5 L, 10 L, 20 L and 50 L), using embodiments of the gas evacuation systems according to the invention. However, other dimensions are suitable as would be recognized by one of ordinary skill in the art.

The bag receiving device 150 can have any suitable size, shape, and configuration for receiving an empty or gas-filled flexible bag. The bag receiving device comprises a base 100 (illustrated as a generally planar base plate) having a surface 101 and at least one raised wall 110 configured for securing one end of the flexible polymeric sheet. The bag receiving device can comprise at least two opposing side walls, and in some embodiments, comprises two sets of opposing side walls. Preferably, as shown in FIG. 7, the raised side wall 112 opposing the raised wall 110 for securing one end of the flexible polymeric sheet has a cut out 112A arranged to receive the conduit 215 of the bag 200 when the bag is placed in the receiving device. The bag receiving device can be made from any suitable material, typically a polymeric material, such as, for example, polypropylene.

While it is possible to secure one end of the flexible polymeric sheet to the base, preferably, the end is secured at a distance above the surface of the base, on a raised side wall configured to secure the end. As noted above, in the illustrated embodiments, portion 111 of raised side wall 110 includes a slot or cut out 120 for receiving an extension or "tongue" end 55 of the flexible polymeric sheet 50. Alternatively, or additionally, the sheet can be secured to the base or side wall by a fastener such as a screw, nail, pin, rivet, bolt, clip, or clamp. While portion 111 is illustrated as part of raised wall 110, it could comprise an additional side wall, or an element attached to raised wall 110.

Typically, the bag receiving device further comprises a retainer arranged to hold one end of the bag. Preferably, the retainer is arranged at the same end of the bag receiving device as the end of the device wherein the end of the flexible polymeric sheet is secured. While it is possible to locate the retainer on the base, preferably, as shown in the illustrated embodiments, the retainer is arranged at a distance above the surface of the base, associated with a raised side wall, preferably, the same side wall that is configured to secure the end of the flexible sheet, wherein the end of the flexible sheet is secured to the side wall at a greater distance from the surface of the base than the retainer. This can be desirable for maintaining the position of the bag while the flexible sheet contacts a flexible wall of the bag and evacuates gas therefrom.

A variety of retainers are suitable for use in embodiments of the invention. For example, the retainer can comprise a slot or cut out for receiving a portion of the bag, or a fastener such as a screw, nail, pin, rivet, bolt, clip, or clamp. For example, as shown in FIGS. 2, 3A, and 3B, showing retainer 130, portion 111 of raised side wall 110 can include slots or cut outs 133A, 133B, arranged in arms 132A, 132B attached to the side wall, and as shown in FIG. 3B, and, if the bag does not already contain a rod (FIG. 4 shows a bag already containing an element such as a rod), the retainer 130 can further comprise rod 135 that is engageable with slots 133A, 133B to removably secure the bag 200 to the bag receiving device.

If desired, the bag receiving device can further comprise an additional element or structure, such as, for example, for handling and/or moving the bag receiving device. For example, the receiving device can have one or more handles attached to side walls and/or one or more cutouts in side walls (e.g., cutouts 140 (140A, 140B, 140C) as shown in FIG. 7).

The following examples further illustrate the invention but, of course, should not be construed as in any way limiting its scope.

EXAMPLE 1

This example demonstrates that gas-filled bags of different sizes can be quickly and completely evacuated in accordance with an embodiment of the invention.

5 L bags are filled with gas, and placed in a gas evacuation system as generally shown in FIG. 4. The bag receiving device has dimensions of 0.65 m×0.31 m, and the sheet is a silicone sheet having a thickness of 8 mm, and a specific gravity of 1.2 g/cm$^3$; thus having a density=1.2 g/cm$^3$×8 mm=9.6 Kg/m$^2$.

The sheet is placed in contact with the upper wall of the flexible container, and the clamp on the conduit leading to the port is opened.

Gas is completely evacuated in about 0.5 to about 1 minute, with no damage to the bags.

20 L bags are filled with gas, and placed in a gas evacuation system as generally shown in FIG. 4. The bag receiving device has dimensions of 0.73 m×0.49 m, and the sheet is a silicone sheet having a thickness of 8 mm, and a specific gravity of 1.2 g/cm$^3$; thus having a density=1.2 g/cm$^3$×8 mm=9.6 Kg/m$^2$.

The sheet is placed in contact with the upper wall of the flexible container, and the clamp on the conduit leading to the port is opened.

Gas is completely evacuated in about 1 to about 1.5 minutes, with no damage to the bags.

EXAMPLE 2

This example demonstrates that a sheet covering at least about 75% of the area of the flexible wall of the bag to be compressed quickly and completely evacuates the gas from a gas-filled bag in accordance with an embodiment of the invention.

20 L bags are filled with gas, and placed in a gas evacuation system as generally described. The bag receiving device has dimensions of 0.73 m×0.49 m, and the sheet is a silicone sheet having a thickness of 8 mm, and a specific gravity of 1.2 g/cm$^3$; thus having a density=1.2 g/cm$^3$×8 mm=9.6 Kg/m$^2$.

The sheet is placed in contact with the upper wall of the flexible container, and the clamp on the conduit leading to the port is opened.

Gas is completely evacuated in about 1.5 to about 2 minutes, with no damage to the bags.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one conduit and at least one port arranged at the bottom end or the top end, wherein the port is in fluid communication with the interior volume and the conduit, and a gas flow path from the interior volume through the port and the conduit is initially closed, the method comprising:

(a) placing the gas-filled flexible bag on a base of a bag receiving device, the receiving device comprising the base having a surface, and at least one raised wall, and having a length and width greater than the length and width of the flexible bag, and securing the top end or the bottom end of the gas-filled flexible bag to the at least one raised wall at a distance above the surface of the base of the receiving device;

(b) placing a flexible polymeric sheet in contact with a flexible side wall of the bag, wherein one end of the flexible polymeric sheet is secured to the at least one raised wall at a distance above the surface of the base of the receiving device, the flexible polymeric sheet having a length and a width substantially covering the flexible side wall of the bag;

(c) opening the gas flow path from the interior volume through the port and conduit; and, (d) emptying the bag by allowing an unsupported weight of the flexible polymeric sheet to compress the bag and pass the gas from the interior volume of the bag through the port and conduit.

2. The method of claim 1, wherein the receiving device further comprises a retainer secured to the receiving device, wherein the retainer is arranged to hold one end of the bag.

3. The method of claim 1, wherein the receiving device comprises at least one set of opposing raised walls.

4. The method of claim 1, wherein at least one raised wall of the receiving device has a cut out arranged to receive the conduit of the bag when the bag is placed in the receiving device.

5. The method of claim 1, wherein the flexible polymeric sheet comprises a silicone sheet.

6. The method of claim 1, wherein the flexible polymeric sheet has a density in the range of from about 3 K g/m$^2$ to about 15 Kg/m$^2$ wherein the density of the flexible polymeric sheet is calculated by the formula: (specific gravity (g/cm$^3$) of the flexible polymeric sheet)×(thickness (mm) of the flexible polymeric sheet)=Kg/m$^2$.

7. The method of claim 2, wherein the receiving device comprises at least one set of opposing raised walls.

8. The method of claim 2, wherein at least one raised wall of the receiving device has a cut out arranged to receive the conduit of the bag when the bag is placed in the receiving device.

9. The method of claim 3, wherein at least one raised wall of the receiving device has a cut out arranged to receive the conduit of the bag when the bag is placed in the receiving device.

10. The method of claim 7, wherein at least one raised wall of the receiving device has a cut out arranged to receive the conduit of the bag when the bag is placed in the receiving device.

11. The method of claim 2, wherein the flexible polymeric sheet comprises a silicone sheet.

12. The method of claim 3, wherein the flexible polymeric sheet comprises a silicone sheet.

13. The method of claim 4, wherein the flexible polymeric sheet comprises a silicone sheet.

14. The method of claim 2, wherein the flexible polymeric sheet has a density in the range of from about 3 Kg/m$^2$ to about 15 Kg/m$^2$ wherein the density of the flexible polymeric sheet is calculated by the formula: (specific gravity (g/cm$^3$) of the flexible polymeric sheet)×(thickness (mm) of the flexible polymeric sheet).

15. The method of claim 3, wherein the flexible polymeric sheet has a density in the range of from about 3 Kg/m$^2$ to about 15 Kg/m$^2$ wherein the density of the flexible polymeric sheet is calculated by the formula: (specific gravity (g/cm$^3$) of the flexible polymeric sheet)×(thickness (mm) of the flexible polymeric sheet)=Kg/m$^2$.

16. The method of claim 4, wherein the flexible polymeric sheet has a density in the range of from about 3 Kg/m$^2$ to about 15 Kg/m$^2$ wherein the density of the flexible polymeric sheet is calculated by the formula: (specific gravity (g/cm$^3$) of the flexible polymeric sheet)×(thickness (mm) of the flexible polymeric sheet)=Kg/m$^2$.

17. The method of claim 11, wherein the flexible polymeric sheet has a density in the range of from about 3 Kg/m² to about 15 Kg/m² wherein the density of the flexible polymeric sheet is calculated by the formula: (specific gravity (g/cm³) of the flexible polymeric sheet)×(thickness (mm) of the flexible polymeric sheet)=Kg/m².

18. The method of claim 1, wherein the flexible polymeric sheet does not cover the at least one port of the bag.

19. A method for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one conduit and at least one port arranged at the bottom end or the top end, wherein the port is in fluid communication with the interior volume and the conduit, and a gas flow path from the interior volume through the port and the conduit is initially closed, the method comprising:
(a) placing an unfilled flexible bag on a base of a bag receiving device, the receiving device comprising the base having a surface and at least one raised wall, and having a length and width greater than the length and width of the flexible bag; and securing the top end or the bottom end of the unfilled flexible bag to the at least one raised wall at a distance above the surface of the base of the receiving device;
(b) filling the flexible bag with gas;
(c) placing a flexible polymeric sheet in contact with a flexible side wall of the bag, wherein one end of the flexible polymeric sheet is secured to the at least one raised wall at a distance above the surface of the base of the receiving device, the flexible polymeric sheet having a length and a width substantially covering the flexible side wall of the bag,
(d) opening the gas flow path from the interior volume through the port and conduit; and,
(e) emptying the bag by allowing an unsupported weight of the flexible polymeric sheet to compress the bag and pass the gas from the interior volume of the bag through the port and conduit.

20. A method for evacuating gas from a gas-filled flexible bag, the bag having a length and a width and comprising opposing flexible side walls sealed at the edges and defining an interior volume therein and containing gas in the interior volume, the bag having a top end, a bottom end, and side ends, at least one conduit and at least one port arranged at the bottom end or the top end, wherein the port is in fluid communication with the interior volume and the conduit, and a gas flow path from the interior volume through the port and the conduit is initially closed, the method comprising:
(a) placing an unfilled flexible bag on a base of a bag receiving device, the receiving device comprising the base having a surface and at least one raised wall, and having a length and width greater than the length and width of the flexible bag; and securing the top end or the bottom end of the unfilled flexible bag to the at least one raised wall at a distance above the surface of the base of the receiving device;
(b) placing a flexible polymeric sheet in contact with a flexible side wall of the bag, wherein one end of the flexible polymeric sheet is secured to the at least one raised wall at a distance above the surface of the base of the receiving device, the flexible polymeric sheet having a length and a width substantially covering the flexible side wall of the bag,
(c) filling the flexible bag with gas;
(d) opening the gas flow path from the interior volume through the port and conduit; and,
(e) emptying the bag by allowing an unsupported weight of the flexible polymeric sheet to compress the bag and pass the gas from the interior volume of the bag through the port and conduit.

\* \* \* \* \*